N. W. HAGEN & L. THIEL.
GEARING.
APPLICATION FILED NOV. 29, 1916.

1,231,880.

Patented July 3, 1917.

Witnesses,
Laura E Morris
Bessie M. Welliver.

Nicholas W. Hagen
and Louis Thiel.
By Robert S. Carr, Attorney.

Inventors,

UNITED STATES PATENT OFFICE.

NICHOLAS W. HAGEN, OF OAKLEY, AND LOUIS THIEL, OF CLIFTON HEIGHTS, OHIO, ASSIGNORS TO THE CINCINNATI LATHE AND TOOL COMPANY, OF HAMILTON COUNTY, OHIO, A CORPORATION OF OHIO.

GEARING.

1,231,880.  Specification of Letters Patent.  Patented July 3, 1917.

Application filed November 29, 1916.   Serial No. 134,072.

*To all whom it may concern:*

Be it known that we, NICHOLAS W. HAGEN, and LOUIS THIEL, citizens of the United States, residing, respectively, at Oakley and Clifton Heights, Hamilton county, Ohio, have invented certain new and useful Improvements in Gearing, of which the following is a specification.

Our invention relates to gearing of the class adapted to the use of machine tools or for other suitable purposes, and the objects of our improvements are to provide driven gear connections so arranged as to transmit a diversity of speeds in successive order to a plurality of shafts; to provide separate means for moving and maintaining either member of a clutch in engagement with its coacting member; to provide novel mechanism for moving and maintaining a driven gear in successive engagement with a plurality of shafts, and to provide simple and durable construction and assemblage of the various members for obtaining facility of operation, accuracy and efficiency of action. These objects together with others which may be incorporated in the claims may be attained in the following described manner, as illustrated in the accompanying drawings, in which,—

Figure 1:
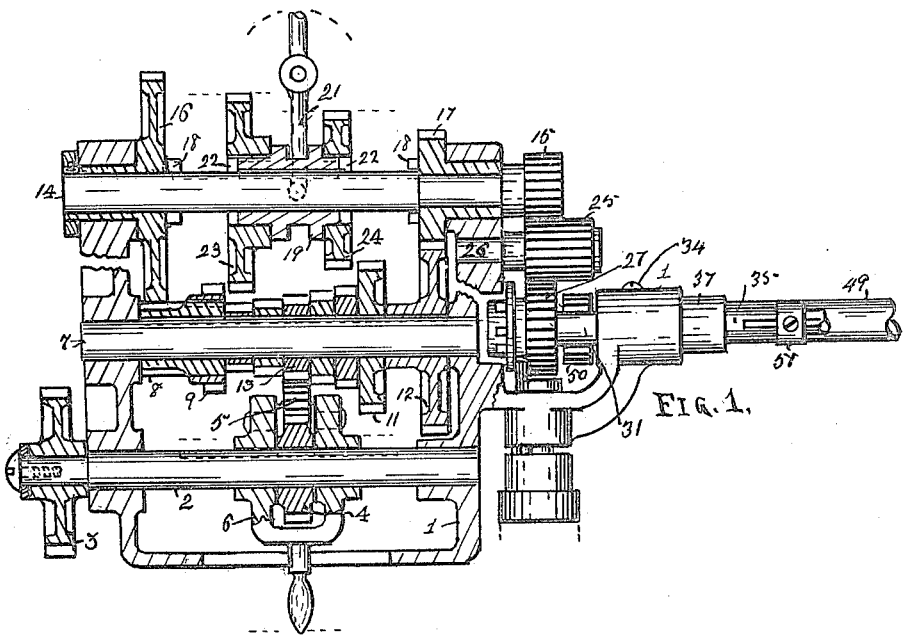
Figures 2, 3:
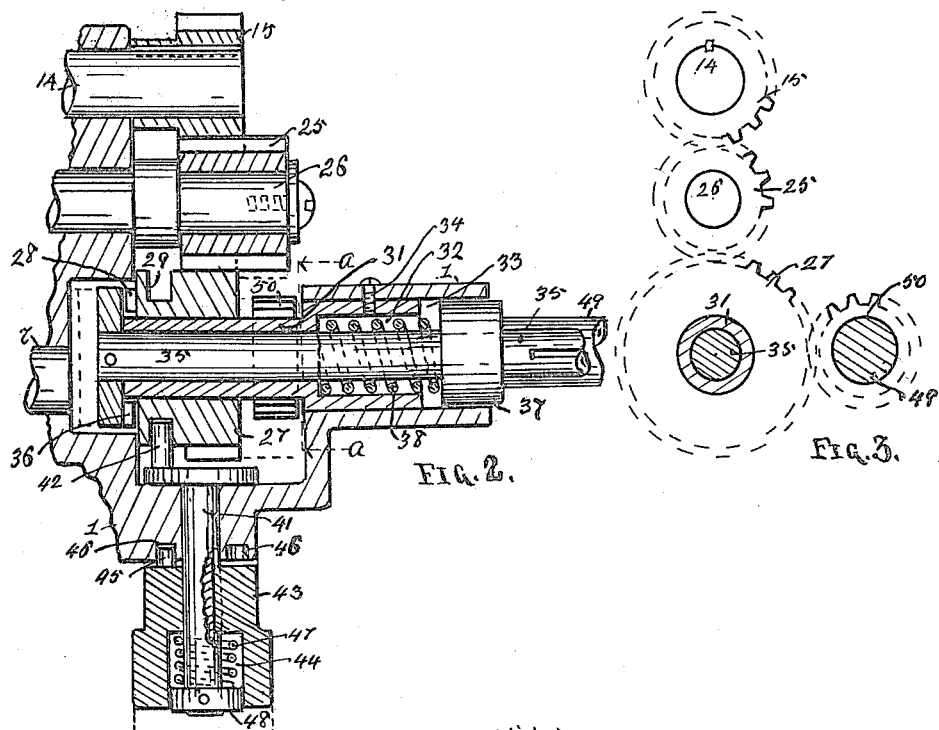

Figure 1 is a plan with parts broken away and parts in section of a gearing embodying our improvements; Fig. 2 an enlarged sectional plan of portions of Fig. 1, and Fig. 3 a section on the line *a—a*, of Fig. 2 showing the relative position of certain of the gears.

In the drawings, 1 represents the support, 2 the driving shaft journaled therein and provided with the driven gear 3. The gear 4 splined on said shaft engages with the tumbler gear 5 which is carried by the tumbler 6 in the usual manner.

The intermediate shaft 7 journaled in the support is provided with the diversely sized gears 8, 9, 11, and 12 and also with the cone of gears 13 which may be selectively engaged by the tumbler gear 5 for driving said shaft at correspondingly different speeds. The driven shaft 14 journaled in the support is provided with the fast gear 15 and with the loose gears 16 and 17 in engagement with the corresponding gears 8 and 12 and each formed with a clutch member 18. A sleeve 19 splined on the shaft 14 and movable thereon by means of the shifter 21 is formed with clutch members 22 on its respective ends adapted to be alternately engaged with the adjacent clutch members 18 on the corresponding gears 16 and 17 for transmitting different speeds from the intermediate to the driven shaft. Said sleeve 19 is provided with the diversely sized gears 23 and 24 which are movable thereby into alternate engagement with the corresponding gears 9 and 11 for transmitting additional speed changes from the intermediate to the driven shaft.

The long pinion 25 is mounted to turn on the fixed stud 26 and in continuous engagement with the gear 15 on the driven shaft. The gear 27 formed with the clutch member 28 and with the annular groove 29 is mounted to turn on the hollow spindle or sleeve 31 and in continuous engagement with the said long pinion. Said sleeve is formed with the counterbore 32 and securely fastened in an opening 33 formed in the support, as by means of the screw 34.

The shaft 35 journaled in sleeves 31 is provided with the clutch member 36 adapted to coact with the corresponding member 28 on gear 27 and is formed with the collar 37 which is movable within the opening 33 formed in the support. The spring 38 within the counterbore 32 serves to move and maintain said shaft with the clutch member 36 in contact with the adjacent end of the sleeve 31 under a yielding pressure.

The shaft 41 journaled in the support is formed with the eccentric pin 42 in continuous engagement with the annular groove 29 in gear 27. The pull knob 43 splined on said shaft is formed with the counterbore 44 and provided with the detent pin 45 adapted to engage alternately with the detent holes 46 formed in the support on opposite sides of the shaft 41. The spring 47 within the counterbore 44 under the resistance of the collar 48 secured on shaft 41 serves to move and maintain the knob with the detent pin thereon in engagement under a yielding pressure with either of the detents 46. The shaft 49 journaled in the support and provided with the gear 50 may represent the lead screw, and the shaft 35 provided with the adjustable stop 51 may represent the feed shaft, of an engine lathe.

In operation, the action of the change speed gear sets has been sufficiently described as transmitting a multiplicity of different speeds to the gear 27. An outward pull of the knob against the yielding resistance of the spring 47 serves to disengage the detent pin from the corresponding hole 46 that the knob with the shaft 41 may then be given a half turn and the detent pin automatically engaged with the other said hole in the support. The half turns of the knob and shaft in this manner actuates the eccentric pin to shift the gear 27 longitudinally on the sleeve 31 in respective opposite directions to its extreme position.

The gear 27 may thus be alternately engaged with the gear 50 for driving the shaft 49 and the clutch member 28 thereon with the clutch member 36 for driving the shaft 35. Contact of the carriage apron of a lathe with the stop 51 in the usual manner serves to move the shaft 35 with the clutch member 36 out of engagement with the clutch member 28 for discontinuing the action of said shaft.

Having fully described our improvements, what we claim as our invention and desire to secure by Letters Patent of the United States is:—

1. A gearing comprising a shaft provided with a gear, a spindle, a shaft journaled therein and provided with a clutch member, automatic means for moving and maintaining the shaft with the clutch member thereon in contact with the end of the spindle under a yielding pressure, a loose gear on the spindle and formed with a clutch member, a shifter for moving said gear alternately into engagement with the former gear and with the clutch member thereon into engagement with the coacting clutch member on the shaft, and driven change speed gear connections in continuous engagement with said loose gear.

2. A gearing comprising a shaft journaled in fixed bearings and provided with a gear, a hollow spindle mounted at a fixed point, a shaft journaled therein and provided with a clutch member, a driven gear formed with a coacting clutch member and mounted to turn on the spindle, and shifting mechanism constructed and arranged to move and maintain said gear in opposite longitudinal positions on the spindle in alternate engagement with the former gear and with the clutch member thereon in engagement with the clutch member on the shaft.

3. A gearing comprising a hollow spindle formed with a counter bore and secured at a fixed point, a shaft journaled in the spindle and provided with a collar and with a clutch member, a spring within the counterbore and in contact with the collar for automatically moving and maintaining said shaft longitudinally with the clutch member in contact with the end of the spindle under a yielding pressure, a gear loose on the spindle and formed with a clutch member, a shifter for moving and maintaining the gear longitudinally on the spindle in predetermined position with the clutch members in engagement, a stop adjustable longitudinally on the shaft adapted to contact with a moving member for moving the shaft longitudinally against the exertion of the spring and disengaging the clutch members, and driven change speed connections with the gear.

4. A gearing comprising a shaft, a gear thereon, a second shaft provided with a clutch member, a loose gear concentric therewith and formed with a coacting clutch member, automatic means for moving and maintaining the latter shaft with the clutch members in engagement under a yielding pressure, means for detachably engaging said gears, and driven change speed gears in continuous engagement with one of said gears.

5. A gearing comprising two shafts, the one being provided with a clutch member, gears concentric with the respective shafts, the one gear being provided with a clutch member, automatic means for moving and maintaining under a yielding pressure the shaft with the clutch member thereon in engagement with the clutch member on the gear, a shifter for moving one of the gears into detachable engagement with the other gear, and a driven change speed gear set in continuous engagement with one of the gears.

6. A gearing comprising a stationary hollow spindle, a shaft journaled therein, a driven loose gear on the spindle, clutch connections from the gear with the shaft, and respective means for shifting the gear and the shaft independently for disengaging said connections.

NICK. W. HAGEN.
LOUIS THIEL.

Witnesses:
W. C. HEINDEL,
R. S. CARR.

Copies of this patent may be obtained for five cents each, by addressing the "Commissioner of Patents, Washington, D. C."